Aug. 9, 1949.　　　F. S. KEAHEY　　　2,478,660

COUPLING ROD BEARING

Filed Oct. 5, 1945

INVENTOR.
Frank S. Keahey
BY Earl D. Chappell
ATTORNEYS.

Patented Aug. 9, 1949

2,478,660

UNITED STATES PATENT OFFICE 2,478,660

COUPLING ROD BEARING

Frank S. Keahey, Ypsilanti, Mich., assignor to Kirsch Company, Sturgis, Mich., a corporation of Michigan Application October 5, 1945, Serial No. 620,460

6 Claims. (Cl. 308—72)

This invention relates to improvements in coupling rod bearings.

This application is a continuation in part of my application for Letters Patent filed February 19, 1944, Serial No. 523,083, now Pat. No. 2,475,393, issued July 5, 1949.

The main objects of this invention are:

First, to provide a bearing or coupling which is well adapted for use in control rods, connecting rods and the like such as are extensively used on airplanes, motor vehicles and in various relations where flexible joints are required.

Second, to provide a coupling or universal joint bearing element comprising two parts which may be readily assembled and which is capable of withstanding very heavy loads and strains in proportion to the material entering into the bearing or joint parts.

Third, to provide a structure having these advantages which is well adapted to withstand lateral stresses.

Fourth, to provide a bearing or coupling structure having a wide range of adaptation and uses.

Objects pertaining to details and economies of the invention will definitely appear from the description to follow. The invention is defined in the claims.

A structure which embodies the features of the invention is clearly illustrated in the accompanying drawing, in which.

Figure 1:
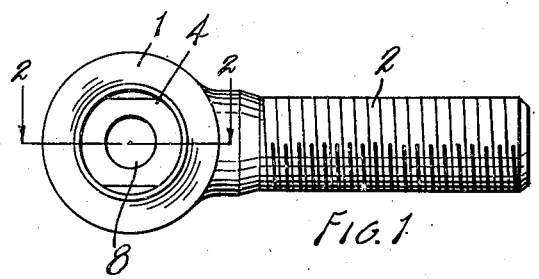
Fig. 1 is a side elevation of a bearing or coupling unit adapted for use in motor vehicles and in other relations where it is desired to provide couplings for various parts.
Figure 3:
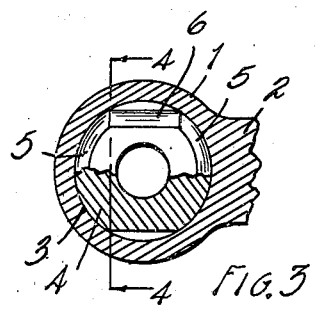
Fig. 3 is a fragmentary longitudinal section on line 3—3 of Fig. 2.
Figure 2:
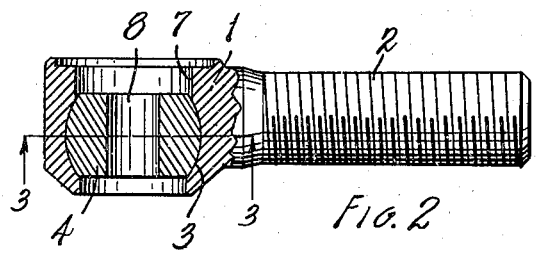
Fig. 2 is a fragmentary view partially in longitudinal section on line 2—2 of Fig. 1.
Figure 4:
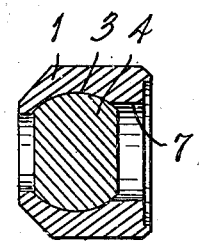
Fig. 4 is a transverse sectional view on line 4—4 of Fig. 3.
Figure 5:
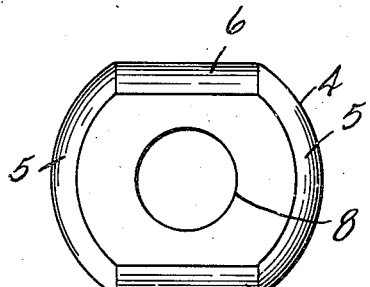
Fig. 5 is an enlarged side elevation view of the ball member.
Figure 9:
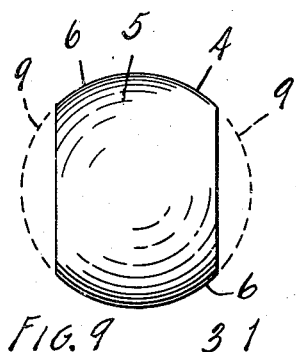
Fig. 9 is a view of the ball member looking from the right or left of Fig. 5, the outline of the stock from which the member is formed being shown by dotted lines.
Figure 6:
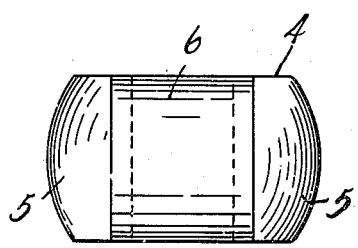
Fig. 6 is an edge view from the top or bottom of Fig. 5.
Figure 7:
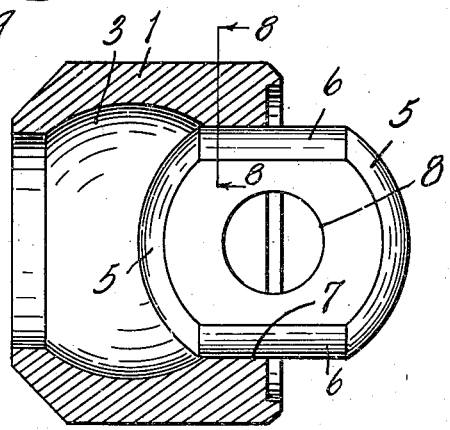
Fig. 7 is an enlarged view partially in transverse section similar to Fig. 3 illustrating the manner of assembling or disassembling the parts of the coupling or bearing.
Figure 8:
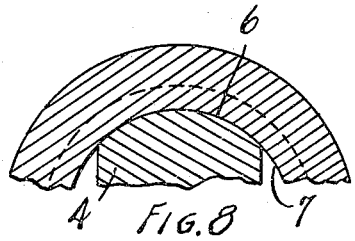
Fig. 8 is a detail section on line 8—8 of Fig. 7.

The embodiment of the invention illustrated comprises a socket member 1 having a shank or stem 2 adapted to be connected to the associated operating part, not illustrated, the stem in this embodiment being threaded. The socket member is provided with an internal spherically curved bearing surface 3, this surface being uninterrupted or extending throughout 360 degrees. The ball member 4 has oppositely disposed spherically curved bearing segments 5 adapted to coact with the internal bearing surface of the socket member. Intermediate these bearing surfaces the ball member is provided with cylindrically curved non-bearing surfaces 6 disposed transversely of the axis of the ball member. The bearing segments 5 intersect the cylindrically curved portions or segments 6. The curvature of the portions 6 corresponds to the curvature of the edge portion 7 of the internal bearing surface 3 and the diameter of the ball member through the non-bearing portions is such as to permit the ball member to be introduced into the socket member when presented edgewise thereto as shown in Figs. 7 and 8.

By thus forming the parts the bearing segments 5 are of substantially maximum length and this is a very desirable feature from a load supporting and wearing standpoint as well as the fact that they have a maximum engagement with the walls of the internal bearing of the socket member, thus utilizing the full strength of the socket member. The members can be assembled without cutting away any part of the wall of the bearing of the socket member as is necessary in the structures of certain prior art patents.

This feature of utilizing the maximum strength or, stated reversely, the elimination of weakening of the parts by forming recesses or openings therein for assembly, is of great practical advantage, particularly where it is desirable to minimize weight, as in airplanes, motor vehicles and various other relations. The structure illustrated is designed for use in motor vehicles.

I have not illustrated the coacting coupling member which is provided with a pin adapted to engage the axial opening 8 in the ball member. In many types the coacting coupling member is in the form of a clevis and in that case the two sides of the member 1 are the same. The ball member may be very economically formed from round bar stock, the diameter of the stock corresponding to the diameter through the cylindrical surfaces or segments 6. Opposite side portions of the stock are cut away as indicated by dotted lines at 9 and the spherically curved bearing surfaces 5 are formed on the end portions of the pieces severed from the stock. This lends itself to very economical manufacture.

I have not attempted to illustrate or describe the various embodiments or adaptations of my invention as it is believed this disclosure will enable the adaptation thereof as may be desired.

Having thus described my invention what I claim as new and desire to secure by Letters Patent is:

1. In a bearing, the combination of a socket member having an internal spherically curved uninterrupted bearing surface, and a ball member having opposed spherically curved segmental bearing portions adapted to coact with the internal bearing surface of the socket member and having cylindrically curved non-bearing portions between its said spherically curved bearing portions, said socket member having a side opening intersecting the spherical bearing surface of the socket member for insertion of the ball member edgewise into said socket member, the line of intersection of the side opening with said spherical bearing surface being circular, the curvature of the said cylindrically curved non-bearing portions being transverse to the axis of the ball member and corresponding to the curvature of the circular line of intersection of said side opening with the spherical bearing surface of the socket member, the diameter of the ball member through said non-bearing portions being substantially equal to the diameter of the circle formed by said line of intersection and such as to permit the introduction of the ball member into the socket member when it is presented edgewise thereto, the spherically curved surfaces of the bearing portions extending to and intersecting the cylindrically curved surfaces of the non-bearing portions.

2. In a bearing, the combination of a socket member having an internal continuous spherically curved bearing surface, and a ball member having opposed spherically curved segmental bearing portions adapted to coact with the internal bearing surface of the socket member and having cylindrically curved non-bearing portions between its said spherically curved bearing portions, said socket member having a side opening intersecting the spherical bearing surface of the socket member for insertion of the ball member edgewise into said socket member, the line of intersection of the side opening with said spherical bearing surface being circular, the curvature of the said cylindrically curved non-bearing portions being transverse to the axis of the ball member, the diameter of the ball member through said non-bearing portions being substantially equal to the diameter of the circle formed by said line of intersection and such as to permit the introduction of the ball member into the socket member when it is presented edgewise thereto, the spherically curved bearing surfaces of the ball member extending to and intersecting the cylindrically curved surfaces of the non-bearing portions.

3. In a bearing, the combination of an outer bearing member having an inwardly facing spherically curved bearing member of 360 degrees in extent, and an inner bearing member having opposed spherically curved segmental bearing portions adapted to coact with said internal bearing surface of said outer bearing member and having transversely and cylindrically curved portions intermediate its said bearing portions, the bearing surfaces extending to and intersecting the cylindrically curved non-bearing surfaces, said outer bearing member having a circular side opening for insertion of the inner bearing member edgewise into the outer bearing member, the diameter of the ball member through its said non-bearing portions being substantially equal to the diameter of the circular side opening and such as to permit the introduction of the ball member into the socket member when it is presented edgewise thereto, the curvature of the non-bearing surfaces corresponding to the curvature of the circular side opening.

4. In a bearing, the combination of an outer bearing member having an uninterrupted internal spherically curved bearing socket, and an inner bearing member having opposed spherically curved segmental bearing portions adapted to coact with said internal bearing surface of said outer bearing member and having transversely and cylindrically curved portions intermediate its said bearing portions, the bearing surfaces extending to and intersecting the cylindrically curved non-bearing surfaces, said outer bearing member having a cylindrically shaped side opening for insertion of the inner bearing member edgewise into the outer bearing member, the cylindrical surface of the side opening intersecting the spherical bearing surface of the outer bearing member, the curvature of the cylindrical surface of the side opening corresponding to the curvature of said cylindrically curved non-bearing portions, the diameter of the ball member through its said non-bearing portions being substantially equal to the diameter of the cylindrically shaped side opening and such as to permit the introduction of the ball member into the socket member when it is presented edgewise thereto.

5. In a bearing, the combination of a socket member having an internal spherically curved bearing surface 360 degrees in extent, and a ball member having opposed spherically curved segmental bearing surfaces adapted to coact with the internal bearing of said socket member and having cylindrically curved non-bearing surfaces between its said spherically curved bearing surfaces, the curvature of said cylindrically curved surfaces being transverse to the axis of said ball member thereof, the cylindrically curved surfaces intersecting the spherically curved bearing surfaces of the ball member, said socket member having a circular side opening for insertion of the ball member edgewise into the socket member, said ball member having an opening therein adapted to receive a pin or the like, the diameter of said ball member through said cylindrically curved surfaces being substantially equal to the diameter of said circular side opening and such as to permit the introduction of the ball member into the socket member when it is presented edgewise thereto.

6. In a bearing, the combination of a socket member having an internal spherically curved bearing surface, and a ball member having diametrically opposed segmental spherically curved peripheral bearing surfaces in bearing coaction with said socket bearing surface and diametrically opposed segmental non-bearing cyclindrically curved surfaces intersecting the spherically curved bearing surfaces of the ball member, said socket member having a side opening for insertion of the ball member edgewise into the socket member, the curvature of the non-bearing surfaces being substantially the maximum which will permit the introduction of the ball member through said side opening into the socket member when it is presented edgewise thereto.

FRANK S. KEAHEY.

REFERENCES CITED

The following references are of record in the file of this patent:

FOREIGN PATENTS

| Number | Country | Date |
|---|---|---|
| 660,407 | Germany | May 24, 1938 |